(12) United States Patent
Passichenko et al.

(10) Patent No.: US 9,491,148 B2
(45) Date of Patent: Nov. 8, 2016

(54) ESTABLISHING A DIRECT CONNECTION BETWEEN TWO DEVICES

(71) Applicant: Facebook, Inc., Menlo Park, CA (US)

(72) Inventors: Viktor Passichenko, San Francisco, CA (US); Damian Kowalewski, Sunnyvale, CA (US); Francislav Penov, Kirkland, WA (US); Yael Maguire, Boston, MA (US); Subodh Iyengar, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 33 days.

(21) Appl. No.: 14/334,927

(22) Filed: Jul. 18, 2014

(65) Prior Publication Data
US 2016/0021192 A1  Jan. 21, 2016

(51) Int. Cl.
| | | |
|---|---|---|
| G06F 21/44 | (2013.01) | |
| H04L 9/32 | (2006.01) | |
| H04L 29/06 | (2006.01) | |
| H04W 4/00 | (2009.01) | |
| H04W 4/20 | (2009.01) | |

(52) U.S. Cl.
CPC ......... *H04L 63/0428* (2013.01); *G06F 21/445* (2013.01); *H04L 9/32* (2013.01); *H04L 63/04* (2013.01); *H04L 63/061* (2013.01); *H04W 4/008* (2013.01); *H04W 4/206* (2013.01)

(58) Field of Classification Search
CPC ....... G06F 21/445; H04L 9/32; H04L 63/04; H04L 63/061
See application file for complete search history.

(56) References Cited

U.S. PATENT DOCUMENTS

| | | | | |
|---|---|---|---|---|
| 7,493,371 B1* | 2/2009 | Bali | ............ | H04L 67/14 709/203 |
| 2006/0174120 A1* | 8/2006 | Rippy | ............ | H04L 63/061 713/171 |
| 2007/0055877 A1* | 3/2007 | Persson | ............ | H04L 63/0272 713/171 |
| 2009/0247197 A1* | 10/2009 | Graff | ............ | H04L 29/12122 455/466 |
| 2010/0299522 A1* | 11/2010 | Khambete | ............ | H04L 63/061 713/168 |
| 2011/0143840 A1* | 6/2011 | Sotoike | ............ | A63F 13/12 463/42 |
| 2011/0258303 A1* | 10/2011 | Nath | ............ | G06F 9/468 709/223 |
| 2012/0050153 A1* | 3/2012 | Dvortsov | ............ | H04W 12/04 345/156 |
| 2012/0218938 A1* | 8/2012 | Tomizawa | ............ | H04W 74/0833 370/328 |
| 2012/0226905 A1* | 9/2012 | Mohanty | ............ | H04L 9/0825 713/168 |
| 2013/0051335 A1* | 2/2013 | Adachi | ............ | H04W 74/0808 370/329 |
| 2013/0103765 A1* | 4/2013 | Papakipos | ............ | G06Q 50/01 709/206 |
| 2013/0121541 A1* | 5/2013 | Hwang | ............ | H04L 63/0861 382/118 |
| 2013/0165234 A1* | 6/2013 | Hall | ............ | A63F 13/00 463/42 |
| 2013/0252656 A1* | 9/2013 | Lee | ............ | H04W 76/023 455/519 |
| 2014/0016507 A1* | 1/2014 | Han | ............ | H04W 28/18 370/254 |
| 2015/0220296 A1* | 8/2015 | Lin | ............ | G06F 3/1423 345/2.3 |

\* cited by examiner

*Primary Examiner* — Dede Zecher
*Assistant Examiner* — Jason C Chiang
(74) *Attorney, Agent, or Firm* — Baker Botts L.L.P.

(57) ABSTRACT

In one embodiment, a method includes, by a first computing device associated with a first user, receiving a connection request from a second computing device associated with a second user. The method also includes confirming that the connection request is associated with the second user and sending to the second computing device an acceptance of the connection request in response to confirming that the connection request is associated with the second user. The method further includes receiving from the second computing device an acknowledgement of the acceptance and, in response to the acknowledgement, allowing information to be exchanged between the first and second computing devices.

19 Claims, 5 Drawing Sheets

ESTABLISHING A DIRECT CONNECTION BETWEEN TWO DEVICES

TECHNICAL FIELD

This disclosure generally relates to establishing a connection between two devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area network (WLAN) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a direct connection may be established between two devices without the need for a network connection. The direct connection may be a wireless connection that uses an existing peer-to-peer-style connection protocol (e.g., WI-FI DIRECT). A direct connection between two devices may be used for exchanging information, such as for example, contact information, files, applications, social-networking information, or any other suitable information.

In particular embodiments, a first and second user who have not previously established a connection (e.g., a social-network connection) may establish a direct connection between their devices (e.g., their smartphones or tablets). For example, the second user's device may broadcast a connection request that includes a nickname, alias, first name, image, or user identifier. The first user's device may receive the connection request, and after confirming that the connection request is authentic, the first user may accept the connection request. In particular embodiments, confirming that the connection request is authentic may include confirming that the connection request is associated with the second user. For example, the first and second users may be located in close physical proximity to one another, and the first user may show their device display to the second user. The second user may indicate to the first user that the connection request displayed on the first user's device is authentic. The first user may then tap on an image or icon displayed on the first user's device, and the first user's device may send back an acceptance of connection request to the second user's device. The first user's device may then receive an acknowledgement of acceptance from the second user's device, at which point, information may be exchanged between the two devices using a direct connection.

In particular embodiments, a first and second user may have previously established a connection (e.g., a social-network connection through a social-networking system), and the social-networking system may have previously provided to their devices public or private keys (or a code, token, or other means for verifying identify). In this case, the two devices can exchange information (e.g., connection request, connection-request acceptance, or acknowledgement of acceptance) using a public-key encryption protocol to confirm or authenticate the users or their devices. As an example and not by way of limitation, authenticating the connection request (e.g., confirming that the connection request received from the second device is associated with the second user) may include the first device decrypting information received from the second device or the first device sending encrypted information to the second device. In particular embodiments, establishing a direct connection between two devices may include a one-way or a two-way authentication protocol. A one-way authentication protocol may include the first device sending encrypted information to the second device, and the second device decrypting the encrypted information. A two-way authentication protocol may include each device sending encrypted information to the other device, and each device decrypting information received from the other device.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
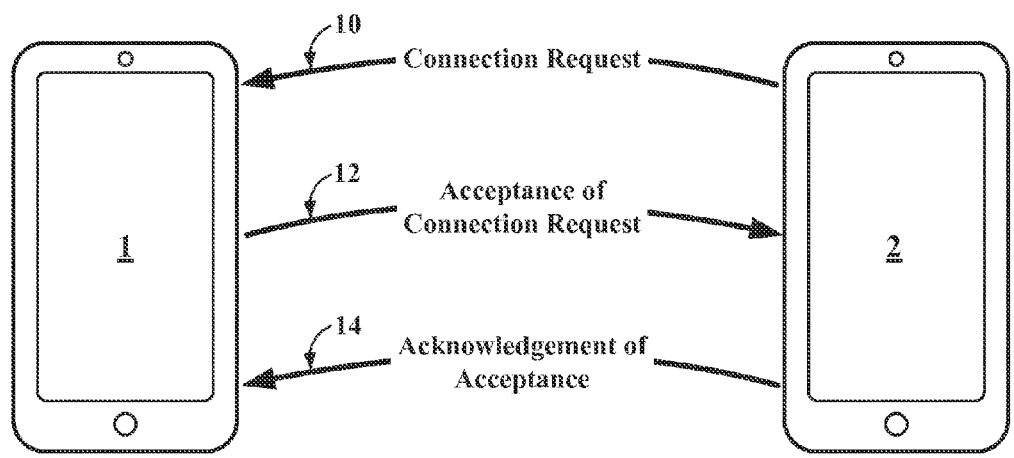
FIG. 1 illustrates example messages sent between two example devices.

FIG. 1 illustrates example messages sent between example devices 1 and 2. The example messages illustrated in FIG. 1 may be associated with establishing a direct connection between the two devices. In particular embodiments, establishing a direct connection between devices may be associated with discovering nearby people, exchanging information (e.g., contact information, files, applications, social-networking information, or any other suitable information), or engaging in in-person friending. In particular embodiments, a direct connection between devices 1 and 2 may be established in a secure manner using a particular security protocol so that devices 1 and 2 can directly exchange information.

In particular embodiments, devices 1 and 2 may each include any suitable device that has at least one processor and is configured for at least one mode of wireless connection, such as for example, cellular, WI-FI, WI-FI DIRECT, BLUETOOTH, BLUETOOTH LOW ENERGY (BLE), near-field communication (NFC), or any other suitable wireless connection type or protocol. In particular embodiments, device 1 or device 2 may be a mobile computing device, such as for example, a smartphone, tablet computer, laptop computer, or any other suitable computing device. In particular embodiments, device 1 or 2 may be referred to as a computing device. In particular embodiments, devices 1 and 2 may be able to connect to a network (e.g., a local private network or a network connected to the Internet) or a social-networking system. Devices 1 and 2 may also be able to communicate directly with each other using a direct connection (e.g., using WI-FI DIRECT) without going through a network. Although this disclosure describes and illustrates particular devices configured for particular modes of wireless connection, this disclosure contemplates any suitable devices configured for any suitable modes of wireless connection.

In particular embodiments, sending or receiving information directly or a direct connection between two devices may refer to information sent from one device directly to another device without being relayed, retransmitted, or passed through an intermediate device (e.g., a router, a third device, a network, or part of a network). As an example and not by way of limitation, devices 1 and 2 may exchange initial messages associated with establishing a direct connection (e.g., connection request 10, connection-request acceptance 12, or acknowledgement 14) using a direct peer-to-peer-style connection (e.g., WI-FI DIRECT). Additionally, after a direct connection between the two devices is established, devices 1 and 2 may exchange information using the direct connection. In particular embodiments, information exchanged directly between devices 1 and 2 may be performed without use of a network connection for either device. As an example and not by way of limitation, devices 1 and 2 may not have access to or may not be connected to a network, and exchanging information between devices 1 and 2 may involve a direct connection between the two devices such that a network connection is not necessary. As another example and not by way of limitation, device 1 or device 2 may be connected to a network (e.g., through a local wireless access point), and information exchanged between devices 1 and 2 may be performed with a direct connection that is not associated with the network. In particular embodiments, sending information by a direct connection may include broadcasting the information so that one or more suitable devices located near the broadcasting device may be able to receive or access the information. In particular embodiments, sending information by a direct connection may include sending information in an encrypted format so that, although one or more devices may be able to receive the encrypted information, the information may only be decrypted by an intended recipient device. Although this disclosure describes and illustrates particular direct connections between particular devices, this disclosure contemplates any suitable direct connections between any suitable devices.

In particular embodiments, a first computing device associated with a first user may receive a connection request from a second computing device associated with a second user. In particular embodiments, the first computing device may receive the connection request directly from the second computing device. As illustrated in FIG. 1, device 1 (which may be associated with a first user) may receive connection request 10 directly from device 2 (which may be associated with a second user). In particular embodiments, connection request 10 may be broadcast by device 2 and received or accessed by one or more suitable devices (including device 1) that are located near device 2. In particular embodiments, connection request 10 may indicate that the second user would like to establish a direct connection between device 2 and another user's device (e.g., device 1).

In particular embodiments, connection request 10 may include a nickname, a name, an image, a user identifier (userid), such as for example, the second user's social-network userid, an alias, a public key associated with the second user, or any other suitable information associated with the second user. As an example and not by way of limitation, connection request 10 may include the second user's nickname and an image selected by the second user, and upon receiving connection request 10, device 1 may display the nickname and image. In particular embodiments, connection request 10 may include an invitation to establish a social-network connection. As an example and not by way of limitation, the second user may configure their device to broadcast connection request 10 which includes the second user's name and an invitation to establish a social-network connection (e.g., establish a friend relationship) with the second user. In particular embodiments, a second user may not be comfortable with broadcasting their identity, and so, connection request 10 may include encrypted information or information related to the second user (e.g., nickname, image, or alias) but not directly identifying the second user, allowing the second user to remain anonymous while broadcasting connection request 10. In particular embodiments, a user with a lower security setting may choose to include various information in connection request 10, such as for example, a public key, a uniform resource identifier (URI), a social-network userid, a phone number, an email address, or a document. Although this disclosure describes and illustrates particular connection requests that include particular information, this disclosure contemplates any suitable connection requests that include any suitable information.

In particular embodiments, prior to receiving connection request 10 from device 2, device 1 may publish or broadcast initial connection information, which may include a nickname, a name, an image, a user identifier (userid), an alias, a public key associated with the first user, or any other suitable information associated with the first user. In particular embodiments, the initial connection information may be broadcast by device 1 and received or accessed by one or more suitable devices (including device 2) that are located near device 1. In particular embodiments, the initial information broadcast by device 1 may be received by device 2, and device 2 may display an entry that includes some or all of the initial information. As an example and not by way of limitation, the initial information may include the first user's nickname and an image selected by the first user, and upon receiving the initial information, device 2 may display the nickname and image. The second user may select the entry displayed on device 2, and device 2 may then send connection request 10. In particular embodiments, prior to sending connection request 10, device 2 (or the second user) may confirm that the initial connection information received by device 2 is authentic or is associated with the first user.

In particular embodiments, device 1 may confirm that connection request 10 is associated with the second user. In particular embodiments, confirming that connection request 10 is authentic or associated with the second user may be part of a security protocol to prevent a man-in-the-middle attack by a malicious third party. Authenticating connection request 10 may prevent a malicious third-party user from eavesdropping on a connection between device 1 and device 2. In particular embodiments, confirming that connection request 10 is associated with the second user may involve a physical-world authentication process (described below), a device-to-device authentication process (also described below), both physical-world and device-to-device authentication processes, or any other suitable authentication process or suitable combination of authentication processes.

In particular embodiments, confirming that connection request 10 is associated with the second user may include device 1 receiving an input from the first user. The input may indicate that the first user received from the second user a verbal, visual, or physical indication that connection request 10 received by device 1 is authentic. The input may also indicate that the first user has agreed to accept the request to establish a direct connection between devices 1 and 2. As an example and not by way of limitation, device 1 may receive connection request 10 that includes the second user's nickname and an image, and an application running on device 1 may indicate that connection request 10 has been received. Indicating that connection request 10 has been received may include displaying the received nickname or image on device 1. In particular embodiments, the first and second users may be located in close physical proximity to one another (e.g., within 1 foot, 10 feet, or within any suitable distance of each other). The first user may show the information (e.g., nickname, icon, message, or image) displayed on device 1 to the second user, and the second user may confirm that the displayed information is authentic and is associated with connection request 10 sent by the second user's device. The second user, upon recognizing the displayed nickname or image, may give a verbal (e.g., the second user may say "Yes" or "OK"), visual (e.g., the second user may nod, smile, wave, or give a "thumbs up" hand gesture), or other suitable physical gesture indicating to the first user that connection request 10 is authentic and was sent by device 2. In particular embodiments, the input received by device 1 from the first user may include a manual input where the first user taps, clicks, or selects a message, icon, or image displayed on a display of device 1 (e.g., the first user taps on the image displayed on device 1). In particular embodiments, if the second user does not recognize the nickname or image or if the second user did not send a connection request, then the second user may indicate to the first user that connection request 10 is not authentic, and the first user may cancel, terminate, or decline the connection request. In particular embodiments, such an example process as described above for confirming that connection request 10 is associated with the second user may be referred to as physical-world authentication where two people are located in close physical proximity and each person may observe the other person's device display.

In particular embodiments, such an example physical-world authentication process may be applied to two users (e.g., the first user and the second user) regardless of whether the two users have previously established a connection (e.g., a social-network connection through a social network). In particular embodiments, a physical-world authentication process may involve a first and second user or their respective devices, and the authentication process may not involve a third party. As an example and not by way of limitation, the first and second users may not have established a connection (e.g., a social-network connection) previously, and a physical-world authentication process may be limited to an interaction between the first and second users and their respective devices. As another example and not by way of limitation, a third party (e.g., a social-networking system) may have previously issued a code, token, or public/private encryption keys to device 1 or 2 prior to initiation of a direct connection between the two devices, but while establishing a direct connection between the two devices, the third party may not be connected to either device or no information may be exchanged between the third party and either device. Although this disclosure describes and illustrates particular processes for confirming that a particular connection request is associated with a particular user, this disclosure contemplates any suitable processes for confirming that any suitable connection request is associated with any suitable user.

In particular embodiments, in response to confirming that connection request 10 is associated with the second user, device 1 may send an acceptance of the connection request to device 2. In particular embodiments, device 1 may send an acceptance of the connection request directly to device 2. As illustrated in FIG. 1, device 1 may send acceptance of connection request 12 (or, connection-request acceptance 12) directly to device 2. As an example and not by way of limitation, device 1 may receive an input from the first user indicating that the first user received from the second user an indication that connection request 10 is authentic, and device 1 may then send connection-request acceptance 12 directly to device 2. In particular embodiments, connection-request acceptance 12 may be in the form of a broadcast message from device 1 that may be received or accessed by one or more suitable devices (including device 2) that are located near device 1. Connection-request acceptance 12 may include an indication that device 1 or the first user has accepted connection request 10 from the second user and would like to establish a direct connection between device 1 and device 2. In particular embodiments, connection-request acceptance 12 may include a nickname, a name, an image, a userid (e.g., the first user's social-networking userid), an alias, a public key associated with the first user, or any other suitable information associated with the first user.

In particular embodiments and as illustrated in FIG. 1, device 1 may receive from device 2 an acknowledgement of the acceptance 14. In particular embodiments, device 1 may receive acknowledgement of acceptance 14 directly from device 2. Acknowledgement of acceptance 14 may be sent by device 2 in response to receiving connection-request acceptance 12 from device 1. In particular embodiments, acknowledgement of acceptance 14 may be in the form of information broadcast by device 2 that may be received or accessed by one or more suitable devices (including device 1) that are located near device 2. Acknowledgement of acceptance 14 may include an indication that device 2 or the second user has acknowledged connection-request acceptance 12 and wishes to proceed with establishing a direct connection between device 1 and device 2.

In particular embodiments, in response to connection-request acceptance 12 received from device 1, device 2 may confirm that connection-request acceptance 12 is associated with the first user prior to sending acknowledgement of acceptance 14 to device 1. In particular embodiments, such an example process for confirming that connection-request acceptance 12 is associated with the first user may include physical-world authentication, as described above. In particular embodiments, confirming that connection-request acceptance 12 is associated with the first user may include device 2 receiving an input from the second user. The input may indicate that the second user received from the first user a verbal, visual, or physical indication that connection-request acceptance 12 is authentic. Although this disclosure describes and illustrates particular information sent or received by particular devices as part of particular authentication processes, this disclosure contemplates any suitable information sent or received by any suitable devices as part of any suitable authentication processes.

In particular embodiments, prior to device 1 or 2 sending sensitive or personal information to the other device through a direct connection, device 1 and device 2 may engage in a device-to-device authentication process that involves sending or receiving encrypted information. As an example and not by way of limitation, one or more portions of connection request 10, connection-request acceptance 12, or acknowledgement of acceptance 14 may be encrypted. For example, connection request 10 broadcast by device 2 may include a social-networking identifier for the second user that is encrypted with the second user's private key or with another user's public key. Similarly, device 1 may include in connection-request acceptance 12 information that is encrypted with the first user's private key or with the second user's public key. In particular embodiments, a device-to-device authentication process may ensure that initial messages exchanged between device 1 and 2 (e.g., connection request 10, connection-request acceptance 12, or acknowledgement of acceptance 14) are authentic and associated with the appropriate first or second user. In particular embodiments, a security protocol for establishing a direct connection between two devices may include a physical-world authentication, a device-to-device authentication, or both a physical-world authentication and a device-to-device authentication.

In particular embodiments, confirming that connection request 10 is associated with the second user may include a device-to-device authentication process where device 1 or device 2 sends a message that includes an encrypted portion. As an example and not by way of limitation, confirming that connection request 10 is associated with the second user may include device 1 comparing a portion of connection request 10 with a previously received code or token (e.g., a token received from a social-networking system). A code or token may include unique, private, or personal information that enables a device to authenticate another device. As another example and not by way of limitation, connection request 10 may include an encrypted nickname, encrypted first name, encrypted userid associated with the second user, encrypted alias, encrypted random number generated by device 2, or any other suitable encrypted information associated with the second user. Similarly, in particular embodiments, confirming that connection-request acceptance 12 is associated with the first user may involve a device-to-device authentication process where device 1 or device 2 sends a message that includes an encrypted portion. As an example and not by way of limitation, connection-request acceptance 12 may include an encrypted nickname, encrypted first name, encrypted userid associated with the first user, encrypted alias, encrypted random number generated by device 1, or any other suitable encrypted information associated with the first user. Although this disclosure describes particular messages having particular encrypted portions, this disclosure contemplates any suitable messages having any suitable encrypted portions.

In particular embodiments, the first and second users may have previously established a social-network connection on a social network. In particular embodiments, as part of establishing a social-network connection, device 1 and device 2 may have previously received, from the social-networking system, public or private keys associated with the first or second user or some other unique code or token that may be used to identify the first or second user. In particular embodiments, a key (e.g., a public key or a private key) may refer to an encryption key used to encrypt information prior to sending the information or a decryption key used to decrypt information that is encrypted. In particular embodiments, devices 1 and 2 may exchange information using a public-key encryption protocol. In particular embodiments, public and private keys associated with a particular user may be referred to as a public-private key pair, and the public and private keys may be digitally signed by the social-networking system to ensure validity of the keys. As an example and not by way of limitation, device 1 may have previously received from a social-networking system a public key associated with the second user, and device 2 may have previously received from the social-networking system a private key associated with the second user and the second user's public key. As another example and not by way of limitation, device 2 may have previously received from the social-networking system a public key associated with the first user, and device 1 may have previously received from the social-networking system a private key associated with the first user and the first user's public key.

In particular embodiments, device 1 or device 2 may employ a challenge-response authentication process. As an example and not by way of limitation, device 1 may generate and send one or more challenge messages or responses to device 2, and vice versa, where the challenge messages or responses may be hashed or encrypted using a public-key encryption protocol. In particular embodiments, connection request 10 received from device 2 may include a portion that is encrypted by device 2 using the second user's private key or the first user's public key. Similarly, in particular embodiments, connection-request acceptance 12 sent by device 1 may include a portion that is encrypted by device 1 using the first user's private key or the second user's public key. In particular embodiments, confirming that connection request 10 is associated with the second user may include device 1 decrypting an encrypted portion of connection request 10 using the second user's public key or the first user's private key. Similarly, in particular embodiments, confirming that connection-request acceptance 12 is associated with the first user may include device 2 decrypting an encrypted portion of connection-request acceptance 12 using the first user's public key or the second user's private key. As an example and not by way of limitation, part of a device-to-device authentication process may include device 2 encrypting some information (e.g., a random number, a name, a code or token, or the second user's social-networking userid) with the public key associated with the first user and sending the encrypted information to device 1. Device 1 may then decrypt this information using the private key associated with the first user, and device 1 may send the decrypted information back to device 2. Device 2 may verify that the decrypted information received from device 1 corresponds to the information that was originally encrypted, which authenticates device 1 to device 2 and indicates that device 1 has the first user's private key. Alternately, after decrypting the information received from device 2, device 1 may then encrypt the information using the public key associated with the second user. Device 1 may then send the re-encrypted information back to device 2, and device 2 may decrypt it using the private key associated with the second user. Although this disclosure describes and illustrates particular information that is encrypted using particular public or private keys, this disclosure contemplates any suitable information that is encrypted using any suitable public or private keys.

In particular embodiments, an exchange of encrypted information could occur as one-way authentication (e.g., device 1 sends encrypted information to device 2, or device 2 sends encrypted information to device 1) or as two-way (or mutual) authentication in which both devices send or receive encrypted information to or from each other. In particular embodiments, one device (e.g., device 1) may be set to always accept connection requests, while another device (e.g., device 2) may be set to always authenticate a connection request or a connection-request acceptance. In other particular embodiments, both devices 1 and 2 may be set to always authenticate connection requests and connection-request acceptances. In particular embodiments, the first user or the second user may set their respective devices to accept all connection requests without requiring any security protocol. As an example and not by way of limitation, the second user may desire to distribute their contact information and a document (e.g., the second user may want to distribute a presentation they just gave at a conference) to nearby people who are interested in receiving that information. The second user may configure their device to send out connection request 10 and, upon receipt of connection-request acceptance 12 from another user's device, automatically send acknowledgement of acceptance 14 and allow a direct connection to be established so that the other user's device may receive the document the second user wishes to distribute.

Figure 2:
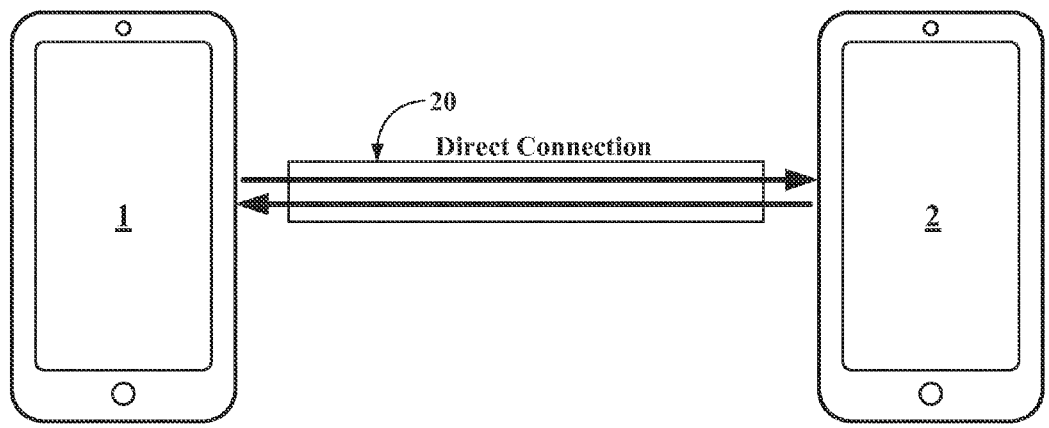
FIG. 2 illustrates the two example devices of FIG. 1 exchanging information using an example direct connection.

FIG. 2 illustrates the two example devices of FIG. 1 exchanging information using example direct connection 20. In particular embodiments, in response to acknowledgement of acceptance 14, device 1 may allow information to be exchanged between device 1 and device 2. In particular embodiments, information exchanged between device 1 and device 2 may include information exchanged directly between devices 1 and 2. In particular embodiments, the information exchanged directly between device 1 and device 2 may include contact information for the first or second user, one or more files, one or more applications, social-networking information associated with the first or second user, a friend request, or any other suitable information. In particular embodiments, the direct exchange of information between device 1 and device 2 may include device 1 sending information to or receiving information from device 2 in an encrypted or otherwise secure form.

In particular embodiments, the direct exchange of information between device 1 and device 2 may include device 1 sending information to or receiving information from device 2 by a direct peer-to-peer-style connection between the two devices. As an example and not by way of limitation, direct connection 20 may be a connection that uses WI-FI DIRECT protocol for the direct exchange of information between the two devices.

In particular embodiments, the direct exchange of information as illustrated in FIG. 2 may occur without either device 1 or device 2 connected to a network. In particular embodiments, some information exchanged through direct connection 20 may be stored on device 1 or device 2 to be sent later to a server or other suitable third party. As an example and not by way of limitation, direct connection 20 may include a friend request, and information associated with the friend request may be stored on device 1 or device 2. Later, when device 1 or device 2 has a network connection, information associated with the friend request may be sent to a social-networking system so that the friend request can be processed by the social-networking system.

In particular embodiments, direct connection 20 may be established between a first device associated with a first user and a second device, where the second device may not be associated with a particular user. As an example and not by way of limitation, the second device may be associated with a store where the first user is shopping. The first user's device and the store's device may establish direct connection 20 after performing a one-way authentication. As an example and not by way of limitation, the store's device may broadcast connection request 10, and the store's device may be configured to automatically send acknowledgement of acceptance 14 in request to any connection-request acceptance 12 it receives. Then, the first user's device may exchange profile information (e.g., shoe size), payment information, or any other suitable information with the store's device using direct connection 20.

Figure 3:
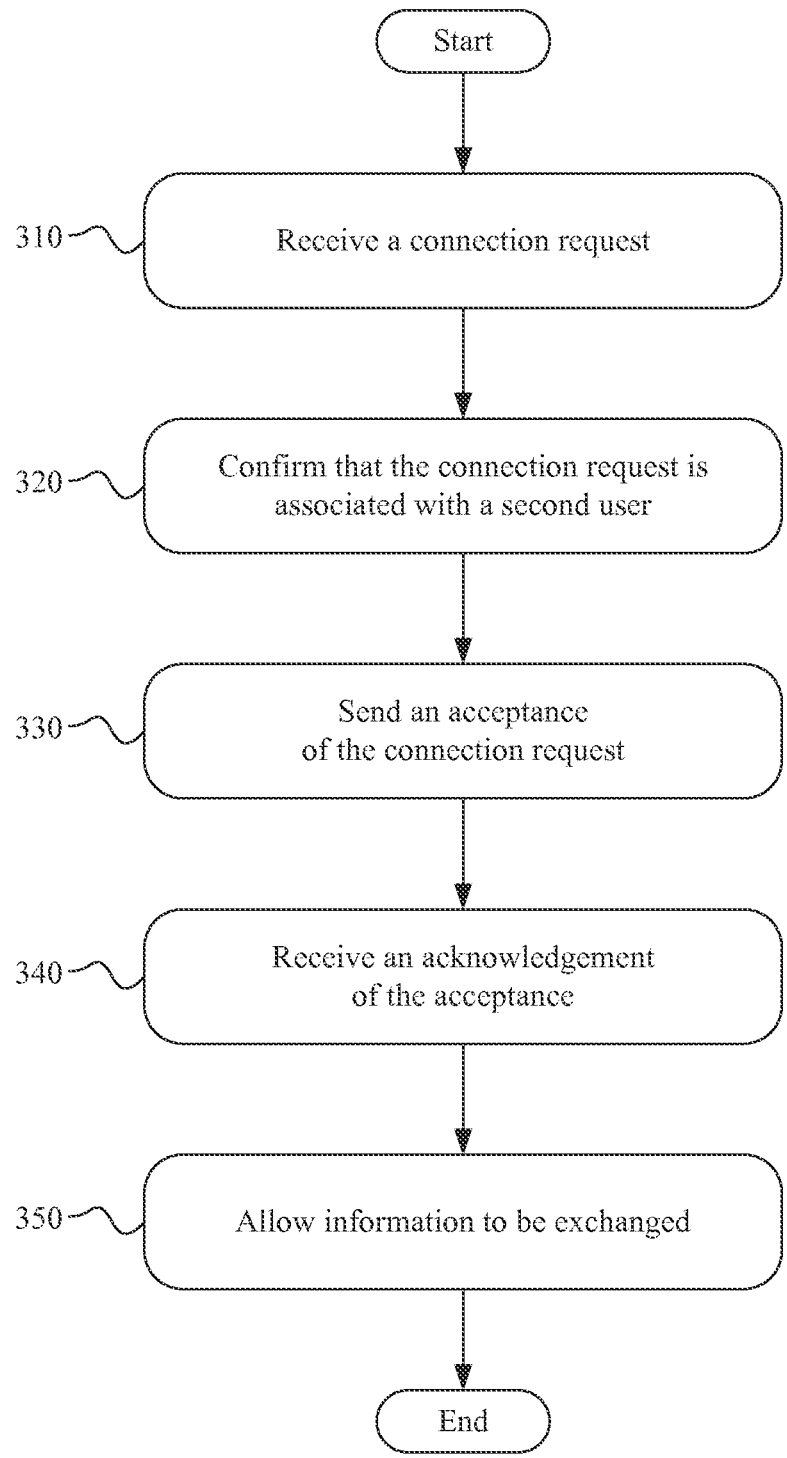
FIG. 3 illustrates an example method for establishing a direct connection between two devices.

FIG. 3 illustrates example method 300 for establishing a direct connection between two devices. The method may begin at step 310, where a connection request is received. In particular embodiments, the connection request may be received by a first computing device associated with a first user and sent by a second computing device associated with a second user. The connection request may be received by the first device directly from the second device such that the connection request is not relayed, retransmitted, or passed through an intermediate device (e.g., a router). As described above, in particular embodiments, before step 310, the first computing device may publish or broadcast initial connection information and the second computing device may present some or all of that information to the second user. The second user may then provide input instructing the second device to send the connection request. At step 320, the first device may confirm that the connection request is associated with the second user. In particular embodiments, confirming that the connection request is associated with the second user may include the first device receiving an input from the first user, where the input indicates that the first user received from the second user a verbal, visual, or physical indication that the connection request is authentic. In particular embodiments, confirming that the connection request is associated with the second user may include the first or second device sending or receiving an encrypted message. At step 330, the first device may send an acceptance of the connection request. The connection-request acceptance may be sent in response to confirming that the connection request is associated with the first user. The connection-request acceptance may be sent directly to the second device. At step 340, the first device may receive an acknowledgement of the acceptance. The acknowledgement may be received directly from the second computing device. At step 350, the first device may allow information to be exchanged, at which point the method may end. In particular embodiments, information may be exchanged directly between the first and second devices. Particular embodiments may repeat one or more steps of method 300 of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for establishing a direct connection between two devices including the particular steps of the method of FIG. 3, this disclosure contemplates any suitable method for establishing a direct connection between two devices including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
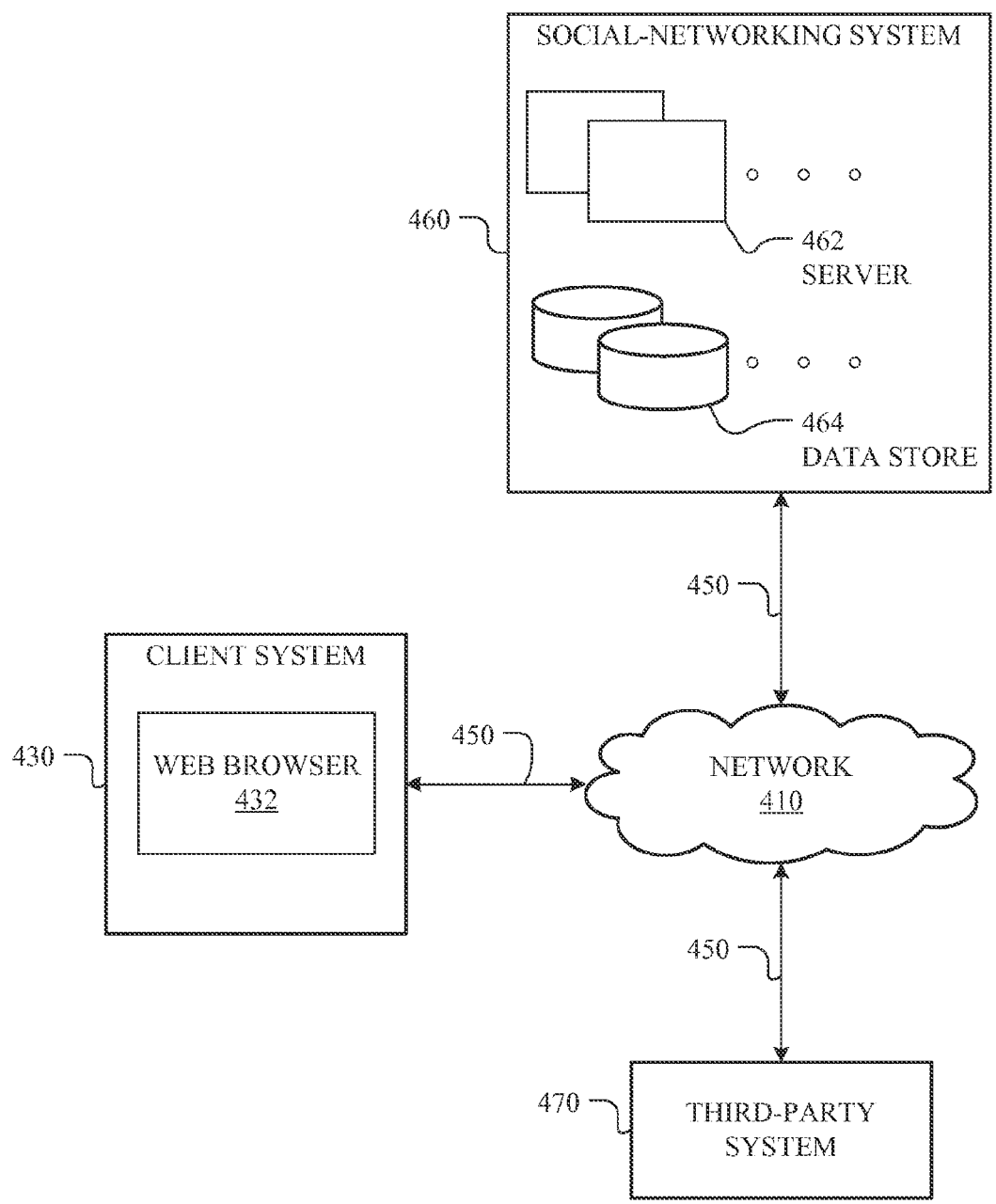
FIG. 4 illustrates an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client system 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 whom they want to be connected to. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
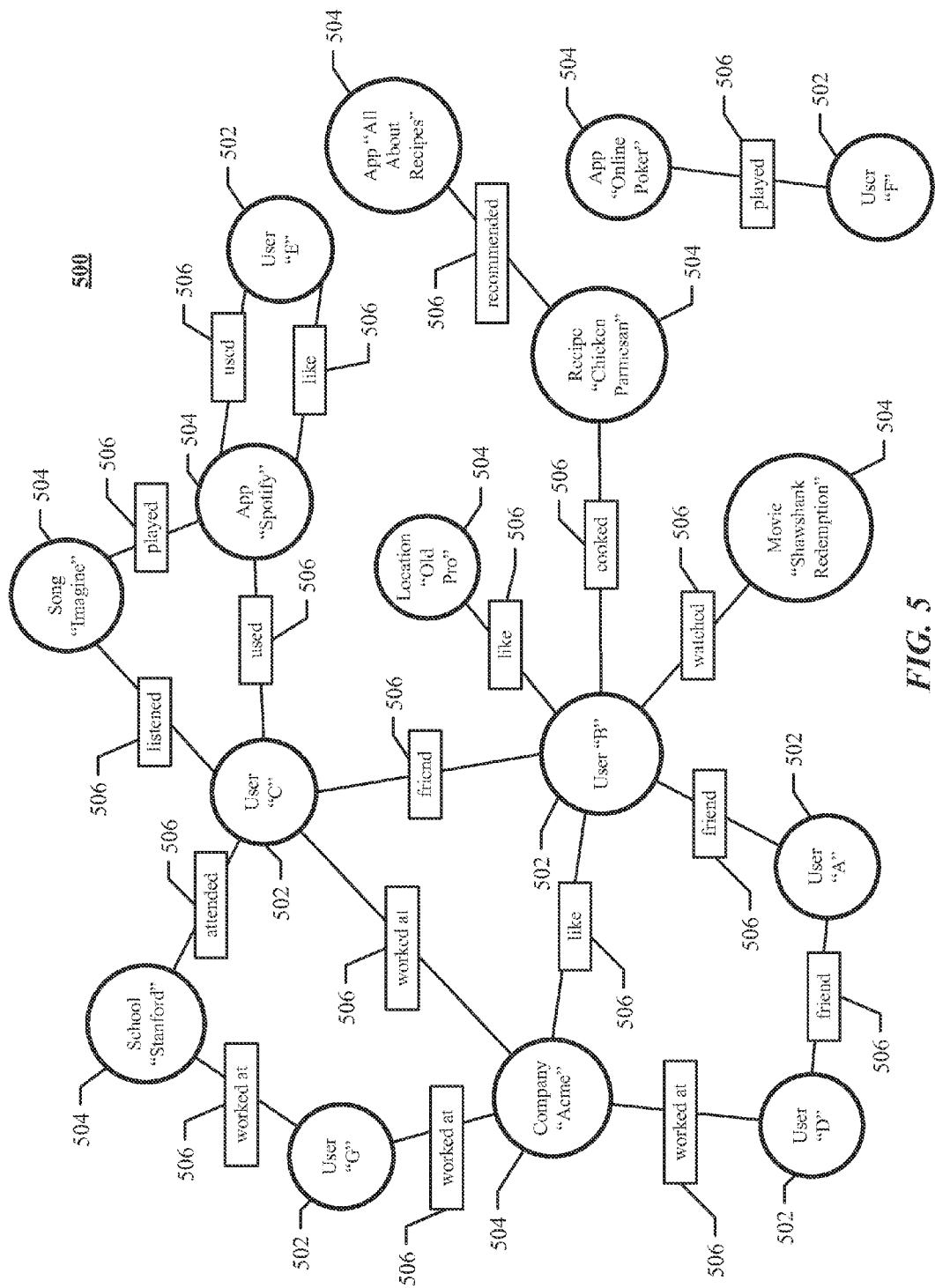
FIG. 5 illustrates an example social graph.

FIG. 5 illustrates example social graph 500. In particular embodiments, social-networking system 460 may store one or more social graphs 500 in one or more data stores. In particular embodiments, social graph 500 may include multiple nodes—which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 460, client system 430, or third-party system 470 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 460. In particular embodiments, a user node 502 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 504 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 460. Profile pages may also be hosted on third-party websites associated with a third-party server 470. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 430 to send to social-networking system 460 a message indicating the user's action. In response to the message, social-networking system 460 may create an edge (e.g., an "eat" edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 460 may send a "friend request" to the second user. If the second user confirms the "friend request," social-networking system 460 may create an edge 506 connecting the first user's user node 502 to the second user's user node 502 in social graph 500 and store edge 506 as social-graph information in one or more of data stores 464. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to a edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 460 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 460 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 460 may create an edge 506 between a user node 502 and a concept node 504 in social graph 500. As an example and not by way of limitation, a user viewing a concept-profile page (such as, for example, by using a web browser or a special-purpose application hosted by the user's client system 430) may indicate that he or she likes the concept represented by the concept node 504 by clicking or selecting a "Like" icon, which may cause the user's client system 430 to send to social-networking system 460 a message indicating the user's liking of the concept associated with the concept-profile page. In response to the message, social-networking system 460 may create an edge 506 between user node 502 associated with the user and concept node 504, as illustrated by "like" edge 506 between the user and concept node 504. In particular embodiments, social-networking system 460 may store an edge 506 in one or more data stores. In particular embodiments, an edge 506 may be automatically formed by social-networking system 460 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

Figure 6:
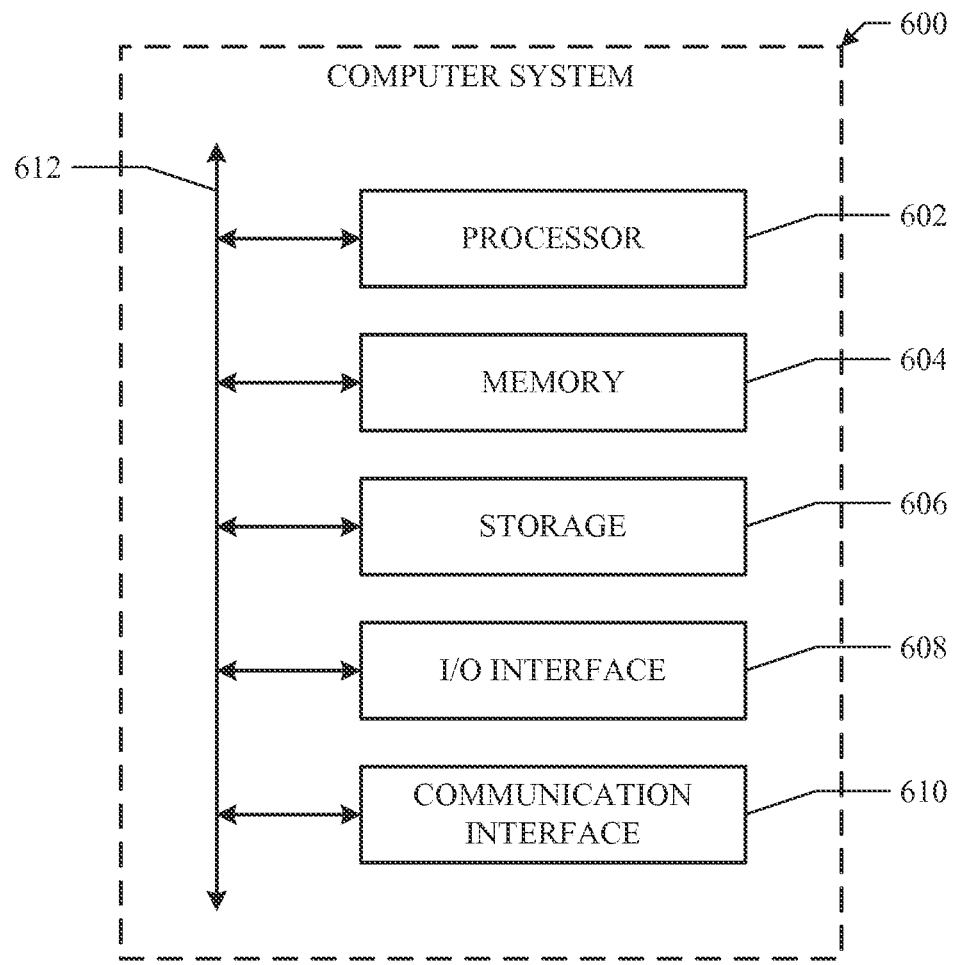
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a first computing device associated with a first user of a social-networking system, receiving a connection request from a second computing device associated with a second user of the social-networking system, wherein:
the first and second users have previously established a social-network connection on the social-networking system;

the first computing device has previously received from the social-networking system (1) a unique code and (2) a public key associated with the second user;

the second computing device has previously received from the social-networking system (1) the unique code and (2) a private key associated with the second user and then encrypted the unique code using the second user's private key; and the connection request received from the second computing device comprises the encrypted unique code;

by the first computing device, confirming that the connection request is associated with the second user, wherein the confirming comprises:

decrypting the encrypted unique code using the second user's public key to produce a decrypted version of the encrypted unique code; and verifying that the decrypted version of the encrypted unique code is valid by determining that the decrypted version of the encrypted unique code matches the unique code previously received from the social-networking system;

by the first computing device, sending to the second computing device an acceptance of the connection request in response to confirming that the connection request is associated with the second user;

by the first computing device, receiving from the second computing device an acknowledgement of the acceptance;

by the first computing device, in response to the acknowledgement, allowing information to be exchanged between the first and second computing devices;

by the first computing device, in response to determining that no network connection is available, storing a portion of the information exchanged between the first and second computing devices, wherein the stored portion of the information is to be sent later to the social-networking system; and by the first computing device, in response to detecting an available network connection:

connecting to the available network connection; and sending, via the available network connection, the stored portion of the information to the social-networking system.

2. The method of claim 1, wherein:

receiving the connection request from the second computing device comprises receiving the connection request directly from the second computing device;

sending the acceptance of the connection request to the second computing device comprises sending the acceptance of the connection request directly to the second computing device;

receiving the acknowledgement of the acceptance from the second computing device comprises receiving the acknowledgement of the acceptance directly from the second computing device; and allowing information to be exchanged between the first and second computing devices comprises allowing information to be exchanged directly between the first and second computing devices.

3. The method of claim 1, wherein the unique code comprises a nickname, a first name, an image, a userid, an identifier, or an alias associated with the second user.

4. The method of claim 1, wherein the connection request further comprises a nickname, a first name, an image, a userid, an identifier, or an alias associated with the second user.

5. The method of claim 1, wherein the confirming that the connection request is associated with the second user further comprises, by the first computing device, receiving an input from the first user, wherein the input indicates that the first user received from the second user a verbal, visual, or physical indication that the connection request received by the first computing device is authentic.

6. The method of claim 1, wherein one or more portions of the connection-request acceptance or the acknowledgement are encrypted.

7. The method of claim 1, wherein:

the second computing device has previously received from the social-networking system a public key associated with the first user;

the first computing device has previously received from the social-networking system a private key associated with the first user and the first user's public key; and the connection-request acceptance sent by the first computing device comprises a portion that is encrypted using the first user's private key.

8. The method of claim 1, further comprising, by the second computing device, in response to the connection-request acceptance received from the first computing device, confirming that the connection-request acceptance is associated with the first user prior to sending the acknowledgement of the acceptance to the first computing device.

9. The method of claim 1, wherein the information exchanged between the first and second computing devices comprises contact information for the first or second user, one or more files, one or more applications, or social-networking information associated with the first or second user.

10. The method of claim 1, wherein the exchange of information between the first and second computing devices comprises the first computing device sending information to or receiving information from the second computing device in an encrypted or otherwise secure form.

11. The method of claim 1, wherein the exchange of information between the first and second computing devices comprises the first computing device sending information to or receiving information from the second computing device by a direct Wi-Fi connection between the first and second computing devices.

12. The method of claim 1, wherein the connection request is broadcast by the second device in a manner that allows the second user to remain anonymous.

13. One or more computer-readable non-transitory storage media comprising instructions operable when executed by a first computing device associated with a first user of a social-networking system to:

receive a connection request from a second computing device associated with a second user of the social-networking system, wherein:

the first and second users have previously established a social-network connection on the social-networking system;

the first computing device has previously received from the social-networking system (1) a unique code and (2) a public key associated with the second user;

the second computing device has previously received from the social-networking system (1) the unique code and (2) a private key associated with the second user and then encrypted the unique code using the second user's private key; and the connection request received from the second computing device comprises the encrypted unique code;

confirm that the connection request is associated with the second user, comprising:
    decrypt the encrypted unique code using the second user's public key to produce a decrypted version of the encrypted unique code; and
    verify that the decrypted version of the encrypted unique code is valid by determining that the decrypted version of the encrypted unique code matches the unique code previously received from the social-networking system;
send to the second computing device an acceptance of the connection request in response to confirming that the connection request is associated with the second user;
receive from the second computing device an acknowledgement of the acceptance;
in response to the acknowledgement, allow information to be exchanged between the first and second computing devices;
in response to determining that no network connection is available, store a portion of the information exchanged between the first and second computing devices, wherein the stored portion of the information is to be sent later to the social-networking system; and
in response to detecting an available network connection:
    connect to the available network connection; and
    send, via the available network connection, the stored portion of the information to the social-networking system.

14. The media of claim 13, wherein:
the connection request received from the second computing device is received directly from the second computing device;
the acceptance of the connection request sent to the second computing device is sent directly to the second computing device;
the acknowledgement of the acceptance received from the second computing device is received directly from the second computing device; and
the information exchanged between the first and second computing devices is exchanged directly between the first and second computing devices.

15. The media of claim 13, wherein the unique code comprises a nickname, a first name, an image, a userid, an identifier, or an alias-associated with the second user.

16. The media of claim 13, wherein the connection request further comprises a nickname, a first name, an image, a userid, an identifier, or an alias associated with the second user.

17. The media of claim 13, wherein confirming that the connection request is associated with the second user further comprises receiving an input from the first user, wherein the input indicates that the first user received from the second user a verbal, visual, or physical indication that the connection request received by the first computing device is authentic.

18. The media of claim 13, wherein one or more portions of the connection-request acceptance or the acknowledgement are encrypted.

19. A first computing device associated with a first user of a social-networking system, the first computing device comprising:
    one or more processors; and
    a memory coupled to the processors comprising instructions executable by the processors, the processors being operable when executing the instructions to:
        receive a connection request from a second computing device associated with a second user of the social-networking system, wherein:
            the first and second users have previously established a social-network connection on the social-networking system;
            the first computing device has previously received from the social-networking system (1) a unique code and (2) a public key associated with the second user;
            the second computing device has previously received from the social-networking system (1) the unique code and (2) a private key associated with the second user and then encrypted the unique code using the second user's private key; and
            the connection request received from the second computing device comprises the encrypted unique code;
        confirm that the connection request is associated with the second user, comprising:
            decrypt the encrypted unique code using the second user's public key to produce a decrypted version of the encrypted unique code; and
            verify that the decrypted version of the encrypted unique code is valid by determining that the decrypted version of the encrypted unique code matches the unique code previously received from the social-networking system;
        send to the second computing device an acceptance of the connection request in response to confirming that the connection request is associated with the second user;
        receive from the second computing device an acknowledgement of the acceptance;
        in response to the acknowledgement, allow information to be exchanged between the first and second computing devices;
        in response to determining that no network connection is available, store a portion of the information exchanged between the first and second computing devices, wherein the stored portion of the information is to be sent later to the social-networking system; and
        in response to detecting an available network connection:
            connect to the available network connection; and
            send, via the available network connection, the stored portion of the information to the social-networking system.

* * * * *